2,806,863
Patented Sept. 17, 1957

2,806,863
9α-HALO-11β,17β-DIHYDROXY-17α-METHYL-ANDROSTANE-3-ONES

Milton E. Herr, Kalamazoo, Mich., assignor to The Upjohn Company, Kalamazoo, Mich., a corporation of Michigan No Drawing. Application March 19, 1956,
Serial No. 572,232

7 Claims. (Cl. 260—397.45)

This invention pertains to organic compounds of the androstane series and is more particularly concerned with novel 9-halo-11β,17β-dihydroxy-17α-methylandrostane-3-ones of the formula

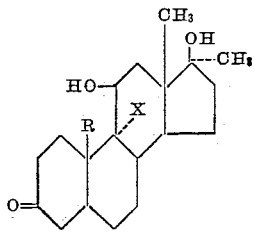

wherein R is selected from hydrogen and methyl and X is a halogen atom having an atomic weight from nineteen to 127, i. e. fluorine, chlorine, bromine and iodine. Preferably X is a halogen atom having an atomic weight from nineteen to 36, i. e. fluorine and chlorine, fluorine being preferred. It is to be understood that the configuration of the 5-hydrogen atom can be α or β and that both forms are included within the scope of the present invention. This application is a continuation-in-part of copending application Serial No. 550,846, filed December 5, 1955, now abandoned.

It is an object of this invention to provide the 9α-halo-11β,17β-dihydroxy-17α-methylandrostane-3-ones of the above formula. Said compounds are potent anabolic and androgenic agents and are used in place of prior anabolic and androgenic agents in known anabolic and androgenic pharmaceutical preparations. For example 9α - fluoro - 11β,17β - dihydroxy - 17α - methyl - 5α-androstane-3-one has 22 times the oral anabolic activity and 7.9 times the oral androgenic activity of 17-methyltestosterone. The compounds also have hypotensive, anti-pituitary, central nervous system depressant, and anti-estrogen activity, and are employed in place of prior agents in pharmaceutical formulations used for such purposes. Other objects and uses will be apparent to one skilled in the art.

The 9α-halo-11β,17β-dihydroxy-17α-methylandrostane-3-ones of the above formula are also useful in the form of their 17-monoacylate and 11,17-diacylate. Their acylates, e. g., mono- or di-acetate, propionate, trimethylacetate, α or β-cyclopentylpropionate, α or β-cyclohexylpropionate, benzoate, phenylacetate, cyclohexylacetate, α or β-phenylpropionate, or other hydrocarbon carboxylate, preferably containing from one to nine carbon atoms, inclusive, are useful for the same purposes as the parent compounds, and in addition these esters are useful for the purification of the parent 9α-halo-11β,17β-dihydroxy-17α-methylandrostane-3-ones.

The 9α-halo-11β,17β-dihydroxy-17α-methylandrostane-3-ones of the present invention can be prepared readily from the corresponding 9α-halo-11β-hydroxy-17α-methyltestosterones (starting compounds are described in copending application Serial No. 527,118, filed August 8, 1955) by hydrogenation of the 4-double bond. The hydrogenation can be carried out by catalytic methods, preferably with hydrogen and a palladium catalyst, and preferably using a solvent, e. g., an alcohol such as ethyl alcohol. This method is particularly suitable for the production of 9α-halo-11β,17β-dihydroxy-17α-methyl-5β-androstane-3-ones. A preferred method for the production of 9α-halo-11β,17β-dihydroxy-17α-methyl-5α-androstane-3-ones is hydrogenation of the 4-double bond, as described above, of 9,11β-epoxy-17β-hydroxy-17α-methyl-4-androstene-3-one (described in copending application Serial No. 527,118, filed August 8, 1955) and treatment of the thus-obtained 9,11β-epoxy-17β-hydroxy-17α-methyl-5α-androstane-3-one with hydrohalic acid to obtain 9α-fluoro (chloro, bromo, or iodo)-11β,17β-dihydroxy - 17α - methyl - 5α - androstane - 3 - one. The 9α-halo-11β,17β-dihydroxy-17α-alkylandrostane-3-ones and 9α - halo - 11β,17β - dihydroxy - 17α - alkyl - 19-norandrostane 3-ones wherein the alkyl radical is preferably a lower-alkyl radical containing from two to eight carbon atoms, inclusive, e. g. ethyl, propyl, isopropyl, butyl, secondary-butyl, amyl, hexyl, heptyl, octyl, etc., and wherein the halo atom is defined as above, are prepared by the same methods and have similar androgenic, anabolic, hypotensive, anti-pituitary, central nervous system depressant, and anti-estrogen activity.

The following examples are illustrative of certain preferred products and processes and are not to be construed as limiting the invention.

*Example 1.*—A mixture of two grams of 9α-fluoro-11β-hydroxy-17α-methyltestosterone in forty milliliters of 95 percent ethyl alcohol is prepared and 200 milligrams of five percent palladium on charcoal catalyst is added. The mixture is then shaken with hydrogen under a pressure of about thirty pounds per square inch for several minutes when one molar equivalent of hydrogen is reacted. The hydrogenated mixture is then filtered to remove the cataylst and the filtrate evaporated to dryness in vacuo. The residue is dissolved in twenty-five milliliters of methylene chloride, the solution diluted with twenty-five milliliters of benzene, and the solution evaporated until the methylene chloride is removed and solid product separates. After standing several hours at room temperature the precipitate is separated by filtration, (the filtrate is saved) washed with benzene and dried to provide 1.547 grams of 9α - fluoro - 11β,17β - dihydroxy - 17α - methyl - 5β-androstane-3-one melting at 193–196 degrees centigrade. Recrystallization of the foregoing product from methylene chloride and normal hexane (Skellysolve B) gave a melting point of 196–197 degrees centigrade (Fisher-Johns block), $[\alpha]_D^{24}$ of plus 119 degrees in ethyl alcohol.

*Anal.*—Calcd. for $C_{20}H_{31}O_3F$: F, 5.61. Found: F, 5.79.

The benzene filtrate (saved from the above isolation) is evaporated to dryness. Chromatography of an acetone solution of the residue on a column containing one hundred parts of a mixture containing two parts of diatomaceous earth (Celite) and one part of activated charcoal (Darco G–60) and elution first with acetone and finally with methylene chloride provides, in the latter eluate, 9α-fluoro - 11β,17β - dihydroxy - 17α - methyl - 5α - androstane-3-one identical with the product of Example 2.

*Example 2.*—One gram of 9,11β-epoxy-17β-hydroxy-17α-methyl-4-androstene-3-one suspended in twenty milliliters of 95 percent ethanol is treated with 100 milligrams of five percent palladium on charcoal and shaken with hydrogen for 7½ minutes, the hydrogen pressure being about thirty pounds per square inch, the catalyst removed by filtration and the filtrate concentrated to dryness in vacuo on a hot water bath. The residue dissolved in benzene and Skellysolve C added. There is obtained 0.215 gram of 9,11β-epoxy-17β-hydroxy-17α-methyl-5α-androstane-3-one; melting point 195–202 degrees centigrade. Recrystallized from acetone it melted at 206–210 degrees centigrade; $[\alpha]_D^{24}$ plus eight degrees in ethanol.

*Anal.*—Calcd. for $C_{20}H_{30}O_3$: C, 75.44; H, 9.50. Found: C, 75.76; H, 9.90. One-half gram of the foregoing oxide is dissolved in ten milliliters of methylene chloride in a polyethylene bottle. This solution is treated with 0.5 milliliter of 48 percent hydrofluoric acid, the bottle sealed, and the mixture stirred by means of a magnetic stirrer for four hours. The mixture is then poured into a solution of 2.0 grams of sodium bicarbonate in forty milliliters of water and stirred for ten minutes. The solid 9α-fluoro-11β,17β-dihydroxy-17α-methyl-5α-androstane-3-one is recovered by filtration, washed with water and dried; yield 0.260; melting point 268–270 degrees centigrade with decomposition. Recrystallized from dilute acetone the melting point is 268 degrees centigrade with decomposition; $[\alpha]_D^{24}$ plus 54 degrees in pyridine.

*Anal.*—Calcd. for $C_{20}H_{31}FO_3$: C, 70.96; H, 9.23; F, 5.61. Found: C, 70.54; H, 9.28; F, 5.42.

*Example 3.*—In exactly the same manner as shown in Example 1, hydrogenation of 9α-fluoro-11β-hydroxy-17-methyl-19-nortestosterone provides 9α-fluoro-11β,17β-dihydroxy-17α-methyl-19-nor-5α-androstane-3-one and 9α-fluoro-11β,17β-dihydroxy-17α-methyl-19-nor-5β - androstane-3-one. Also following the procedure of Example 1, 9α-chloro-, 9α-bromo-, and 9α-iodo-11β-hydroxy-17α-methyltestosterone are hydrogenated using hydrogen and a palladium catalyst to produce 9α-chloro-, 9α-bromo-, and 9α-iodo-11β,17β-dihydroxy-17α-methyl-5α (and 5β)-androstane-3-one. Likewise 9α-chloro-, 9α-bromo-, and 9α-iodo-11β-hydroxy-17α-methyl-19-nortestosterone are hydrogenated according to the procedure of Example 1 to provide 9α-chloro-, 9α-bromo-, and 9α-iodo-11β,17β-dihydroxy-17α-methyl-19-nor-5α (and 5β) -androstane-3-one. When the foregoing 5α compounds are desired, the process of Example 2 is preferably employed. Other 9α-halo-11β,17β-dihydroxy-17α-alkyl-5α (and 5β) -androstane-3-ones and 9α-halo-11β,17β-dihydroxy-17α-alkyl-19-nor-5α (and 5β) -androstane-3-ones, wherein the alkyl radical and halo atom are as defined and illustrated above, are prepared by the same procedures from corresponding 9α-halo-11β-hydroxy-17α-alkyltestosterones and 9α-halo-11β-hydroxy-17α-alkyl-19-nortestosterones.

*Example 4.*—A solution of 9α-fluoro-11β,17β-dihydroxy-17α-methyl-5α-androstane-3-one in dry pyridine is treated with acetic anhydride, the molar ratio of steroid to acetic anhydride being about one to three, and the resulting mixture is heated under reflux for six hours. The mixture is then cooled, diluted with water while stirring, and the solid precipitate obtained removed by filtration. The solid is washed with two percent aqueous hydrochloric acid solution and with water, and then dried under vacuum. Recrystallization or chromatographic separation provides purified 9α-fluoro-11β,17β-dihydroxy-17α-methyl-5α-androstane-3-one 17-acetate. In exactly the same manner 9α-fluoro-11β,17β-dihydroxy-17α-methyl-5β-androstane-3-one 17-acetate, 9α-fluoro-11β,17β-dihydroxy-17α-methyl-19-nor-5α-androstane-3-one 17-acetate and 9α-fluoro-11β,17β-dihydroxy-17α-methyl-19-nor-5β-androstane-3-one 17-acetate are obtained by using 9α-fluoro - 11β,17β - dihydroxy-17α-methyl-5β-androstane-3-one, 9α-fluoro-11β,17β-dihydroxy-17α-methyl-19 - nor-5α-androstane-3-one and 9α-fluoro-11β,17-β-dihydroxy-17α-methyl-19-nor-5β-androstane-3-one, respectively, as the starting steroid. Substituting the appropriate acylating agent, i. e., the appropriate acid, acid anhydride or acid chloride, for the acetic anhydride in the above process provides other 17-acylates of 9α-fluoro-11β,17β-dihydroxy-17α-methyl-5α(and 5β)-androstane-3-one and 9α-fluoro-11β,17β-dihydroxy-17α-methyl-19-nor-5α(and 5β)-androstane-3-one including the 17-formate, propionate, trimethylacetate, fuorate, α or β-cyclohexylpropionate, benzoate, phenylacetate, α or β-cyclopentylpropionate, α or β-phenylpropionate, methylbenzoate, α or β-furylacrylate, valerate, methacrylate, and the like. By following the foregoing acylation procedure 17-acylates wherein the acylate radical is as defined and illustrated above, are prepared from 9α-chloro-, 9α-bromo-, and 9α-iodo-11β,17β-dihydroxy-17α-methyl-5α(and 5β)-androstane-3-one and 9α-chloro-, 9α-bromo-, and 9α-iodo-11β,17β-dihydroxy-17α-methyl-19-nor - 5α(and 5β)-androstane - 3-one.

*Example 5.*—A mixture of 9α-fluoro-11β,17β-dihydroxy-17α-methyl-5α-androstane-3-one 17-acetate, a large excess of acetic anhydride to serve as both acylating agent and solvent, and a trace of the strongly acidic catalyst sulfuric acid is heated at a temperature of about one hundred degrees centigrade for twelve hours. The hot solution then is poured over cracked ice and the resulting mixture stirred until hydrolysis of the excess acetic anhydride is complete. The solid product which precipitates is removed by filtration, washed with water and dried under vacuum. Purified 9α-fluoro-11β,17β-dihydroxy-17α-methyl-5α-androstane-3-one 11,17-diacetate is obtained by recrystallization or chromatographic separation. 9α-fluoro-11β,17β-dihydroxy-17α - methyl - 5β-androstane-3-one 11,17-diacetate is obtained in exactly the same manner by substituting 9α-fluoro-11β,17β-dihydroxy-17α-methyl-5β-androstane-3-one for the above starting steroid. By substituting the appropriate acylating agent, i. e., the appropriate acid anhydride or isopropenyl acylate, in the above procedure other 11,17-diacylates of 9α-fluoro-, 9α-chloro-, 9α-bromo-, and 9α iodo-11β,17β-dihydroxy-17α-methyl-5α (and 5β) - androstane-3-one and 9α-fluoro-, 9α-chloro-, 9α-bromo-, and 9α-iodo-11β,17β-dihydroxy-17α-methyl-19 - nor - 5α (and 5β)-androstane-3-one are obtained including the 11,17-dipropionate, diacetate, di-(trimethylacetate), difuroate, di-(α or β-cyclohexylpropionate), dibenzoate, di-(phenylacetate), di-(α or B-cyclopentylpropionate), di-(α or β-phenylpropionate), di-(methylbenzoates), di-(α or β-furylacrylates), divalerate, di-(methacrylate), 11-acetate 17-formate, 11-(β-cyclopentylpropionate) 17-acetate, and the like. The foregoing 17-acylates and 11,17-diacylates can also be prepared by hydrogenation, according to the procedures of Examples 1 and 3, of corresponding 17-acylates and 11,17-diacylates of 9α-fluoro-, 9α-chloro-, 9α-bromo-, and 9α-iodo-11β-hydroxy-17α-methyltestosterone and 9α-fluoro-, 9α-chloro-, 9α-bromo-, and 9α-iodo-11β-hydroxy-17α-methyl-19-nortestosterone. The 17-monoacylates and 11,17-diacylates of other 9α-halo-11β,17β-dihydroxy-17α-alkyl-5α (and 5β)-androstane-3-ones and 9α-halo-11β,17β-dihydroxy-17α-alkyl-19-nor-5α (and 5β)-androstane-3-ones, wherein the alkyl and acylate radicals and the halo atom are as defined and illustrated above, also are prepared by the foregoing procedures.

I claim:

1. 9α-halo-11β,17β-dihydroxy-17α-methylandrostane-3-one of the formula

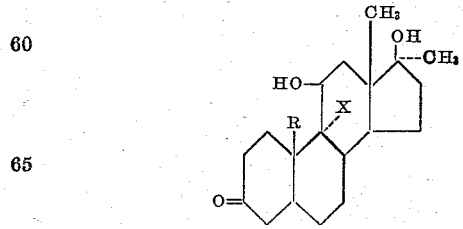

wherein R is selected from hydrogen and methyl and X is a halogen atom having an atomic weight from nineteen to 127.

2. 9α-halo-11β,17β-dihydroxy-17α-methylandrostane-3-one wherein the halo atom has an atomic weight from nineteen to 36.

3. 9α-halo-11β,17-dihydroxy - 17α - methyl - 19 - norandrostane-3-one wherein the halo atom has an atomic weight from nineteen to 36.

4. 9α-fluoro-11β,17β-dihydroxy-17α-methyl-5α-androstane-3-one.

5. 9α-fluoro-11β,17β-dihydroxy-17α-methyl-19-nor-5α-androstane-3-one.

6. 9α-fluoro-11β,17β-dihydroxy-17α-methyl-5β-androstane-3-one.

7. 9α-fluoro-11β,17β-dihydroxy-17α-methyl-19-nor-5β-androstane-3-one.

No references cited.